Aug. 6, 1968 W. VON UNWERTH 3,395,513

PROCESS AND DEVICE FOR THE TREATMENT OF GASES

Filed Sept. 28, 1964 2 Sheets-Sheet 1

INVENTOR
W. VON UNWERTH
BY Lowry & Rinehart
ATTYS.

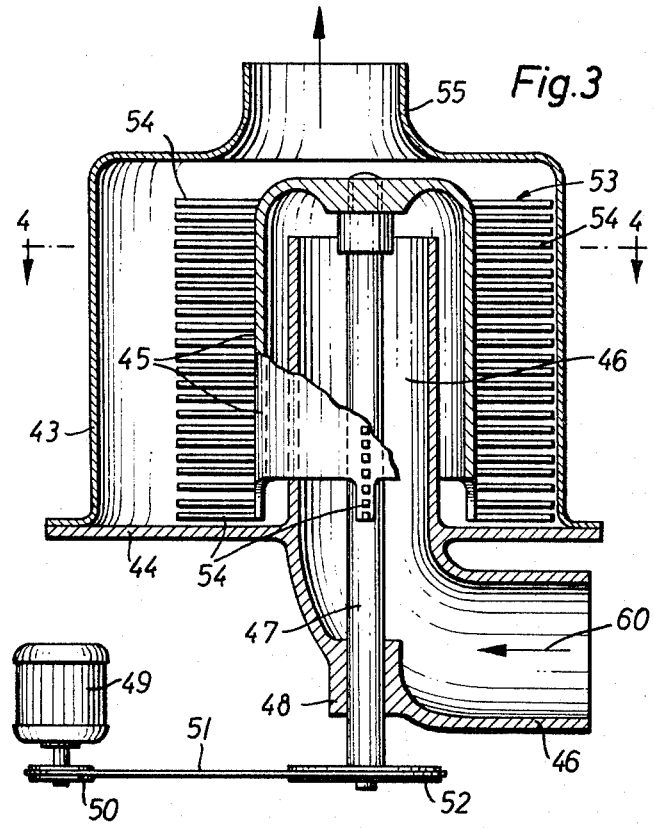
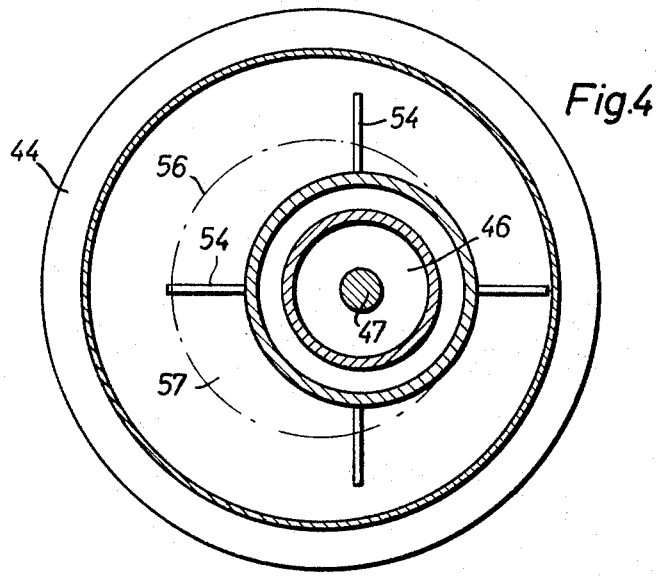

United States Patent Office 3,395,513
Patented Aug. 6, 1968

3,395,513
PROCESS AND DEVICE FOR THE
TREATMENT OF GASES
Werner von Unwerth, Drususgasse 1–5,
Cologne, Germany
Filed Sept. 28, 1964, Ser. No. 399,455
3 Claims. (Cl. 55—86)

This invention relates to a process and a device for the treatment of gases, particularly for the cleaning and purification of gases, e.g. waste gases, exhaust gases, air and the like.

The known prior art devices which are used for the cleaning of gases become blocked after long periods of operation, thus reducing the gas flow therethrough, and are also expensive to manufacture and maintain. Wet cleaning apparatus for purifying air are, in most cases, incomplete in effect, since with such apparatus gas bubbles in which dust is contained often pass through the apparatus unaffected because of the water repellent characteristics of dust, particularly in the case of residues coming from the burning of coal. Wet cleaning also automatically increases the negative pressure of such apparatus causing an increase in operating and maintenance costs. If it is desired to achieve a reasonably adequate separation of the solid substances from gases with hitherto known types of purifying devices, it has been found unavoidable that these devices are necessarily disadvantageously relatively large and heavy.

It is, therefore, an object of the present invention to obviate the above mentioned disadvantages of conventional gas purification apparatus and methods.

A further object of this novel invention is to provide a process for the purification of a gas, e.g. waste or exhaust gas, air or the like, or for transferring particles of solid substances in a gas to a liquid medium, which includes the step of passing the gas to be treated through the interior of a flowing ring or hollow column of liquid medium, and combing the gas through the liquid medium in a direction transverse to the direction in which said gas is flowing.

Thus, in accordance with one embodiment of the invention the gas is conducted through the interior of a ring or a hollow column of liquid which is formed by rotational or centrifugal movement, and combing means is provided for rotation about an axis parallel to but eccentrically disposed with respect to the center or axis of the ring of liquid medium so that at least a substantial portion of said combing means passes successively into and out of the liquid medium.

The process according to the invention provides varied treatments of the gas. If the liquid medium is to remove particles of solid substances contained therein, the same are driven out of the gas by the passage thereof through the ring of liquid and are given up to the liquid. It is further possible to use the process according to the invention for transferring one or more selected gaseous constituents of a gas to be treated to a liquid medium, provided that the gaseous constituents to be transferred or removed are soluble in the liquid and the remaining gaseous constituents are not. This applies, for example, to sulphur dioxide which is present in smoke gas. This process is basically that of "washing" the gas to be treated by the passage of the gas through the ring of liquid. At no time during such treatment does the pressure of gas stream decrease whereupon a greater volume of gas can be purified or washed during a predetermined period of time and a correspondingly more efficient cleansing of the gas is effected.

The process of the invention may also be used for transferring particles of solid substance contained in the gas to the liquid, if this is desired. The liquid used can be water or, alternatively, a liquid which is particularly suitable for receiving and retaining the deposits which are to be removed. The ring of liquid employed in the invention makes it possible for the rotational speed of the rotational member to be optionally increased without the formation of water mist, in cases in which the liquid is water, and without modifying the liquid surface level bounding the space through which the gases flow. Turbulent intermixing or spraying of the water and the gas is also avoided so that the gas is treated by a method which is relatively "dry" i.e. splash-free.

A device constructed according to the invention is provided with a rotatable member having radially projecting vanes with numerous apertures and the rotatable member and the vanes are disposed eccentrically with respect to the axis of a surrounding housing. The housing and the rotatable member are rotated with respect to one another, and owing to the eccentric position of the rotating member and the housing, and hence relative to the liquid rotating on the wall of the housing by centrifugal force, the vanes pass successively into and out of the liquid. As this occurs the vanes, which may also be in the form of fingers or projections, beat through the free space within the ring of liquid through which the gas is conducted. The particles of solid substances admixed in the gas are conducted by the vanes or projections out of the gas directly into the liquid of the ring of liquid. It should be noted that the gas is completely surrounded by the liquid so that the particles of solid substances which slide along the inner surface of the ring of liquid are drawn in and absorbed by the liquid. With the high speed of rotation of the ring of liquid, foaming of the liquid does not occur. As a further result, a drying effect is thereby obtained for the throughflowing gas.

Advantageously, the housing containing the liquid is rotatably mounted and driven. Moreover, the rotatable housing may be situated within a stationary housing and may have a downwardly turned funnel-shaped portion. The upper and the lower ends of the funnel-shaped portion are closed, except for at least one outlet at one end of the funnel portion.

In a further embodiment of the invention, a stationary housing surrounds a rotatable member which is constructed in the form of a downwardly open bell on a periphery of which there are arranged radially projecting teeth, e.g. in the form of a comb, which form a combing member. The gas is introduced into the bell through a pipe extension, is reversed in direction of flow within the bell, and rises upward outside the bell through a space within a ring of liquid through which the combing member moves with a combing action.

In accordance with this invention the combing member or the vanes may be constructed as a scoop-like member or can be of helical form. It is also possible to provide a worm device on the rotating member between the vanes. The teeth of the combing member can also be scalloped in an oblique arrangement. By these varied means the purifying device does not present any internal resistance to reduce the draft of the device, but can even provide some delivery power of its own.

The invention will be best understood and described in connection with the drawings in which.

FIG. 3 is a diagrammatic fragmentary longitudinal sectional view of another device constructed in accordance with this invention, and illustrates a bell-shaped member having radially outwardly projecting comb-like members mounted for eccentric rotation in a stationary housing; and FIG. 4 is a cross-sectional view of the device of FIG. 3 taken along line 4—4 thereof, and more clearly illustrates the eccentric relationship between the bell-shaped member and the housing.

Figure 1:
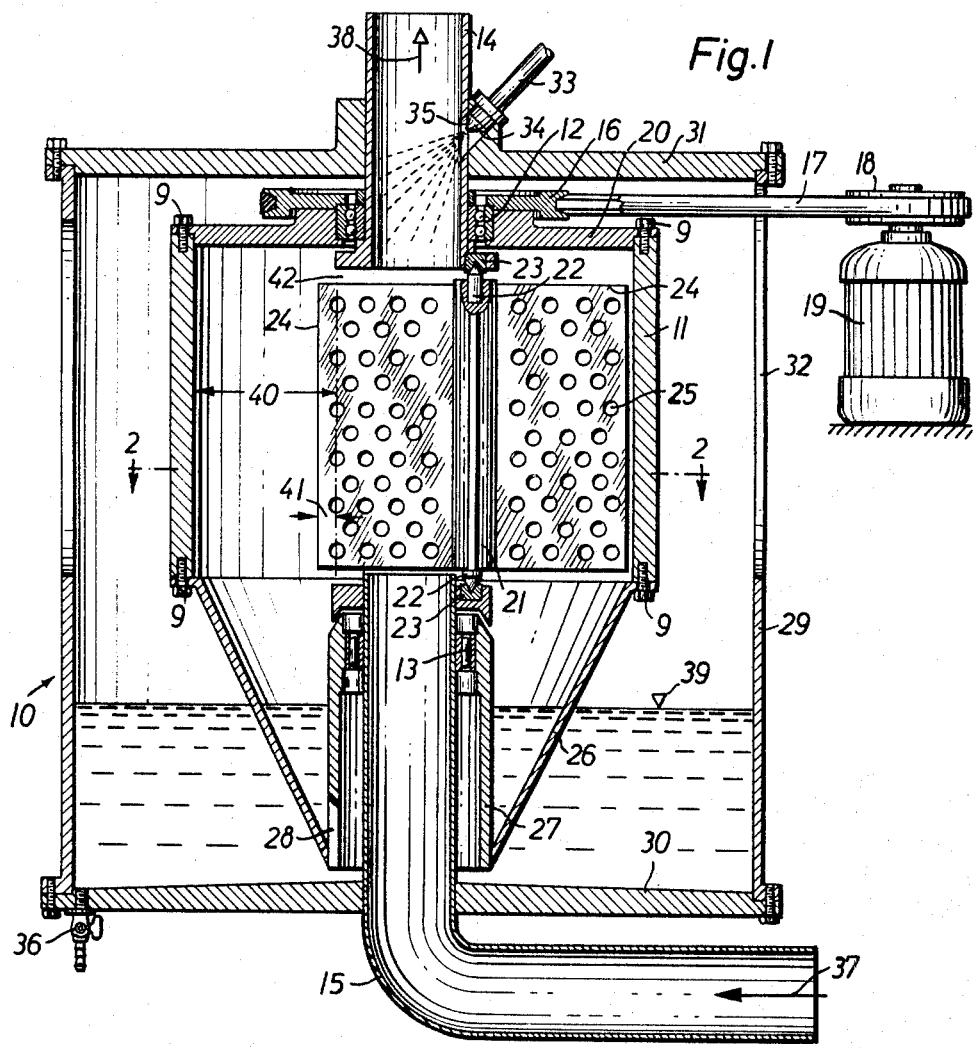
FIG. 1 is a diagrammatic longitudinal sectional view of one embodiment of a device constructed in accordance with this invention for the purification of gases, and illustrates a rotatable member eccentrically mounted relative to a stationary housing and conduits for introducing gas into and withdrawing gas from the housing.
Figure 2:
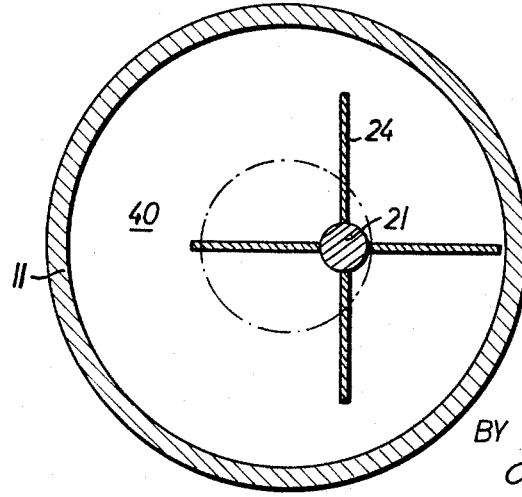
FIG. 2 is a cross-sectional view of the device of FIG. 1 taken on the line 2—2 of FIG. 1, and illustrates vanes of the rotatable member.

A device 10 of FIGS. 1 and 2 for purifying gases comprises a cylindrical member or housing 11 which is mounted on bearings 12, 13 which permit the rotation of the housing 11 about stationary axially aligned pipes or conduits 14 and 15. A pulley 16 freely surrounds the pipe 14 and is fastened to a cover 20 of the housing 11. The pulley 16 is connected by a V-belt 17 to a pulley 18. Pulley 18 is driven by a motor 19. Within the housing 11 is a rotating member 21 positioned eccentrically with respect to the axis of the pipes 14 and 15. This mounting of the member 21 is effected by pins 22 which are fixedly received in opposed sockets 23 of the pipes 14, 15. Arranged on the rotating member 21 are vanes 24 which project radially outwardly therefrom. The surface of each of the vanes is preferably provided with suitable apertures 25, or may, alternatively, be constructed as a screen from suitable metallic, plastic or like material.

Screws 9 tightly connect the housing 11 with a funnel-shaped portion 26 open at opposite ends thereof. A sleeve 27 is connected to the funnel-shaped portion 26. The sleeve 27 is rotatably mounted in the bearing 13. The sleeve 27 possesses at least one outlet 28. This entire assembly is disposed within a stationary housing 29 that is supported by a plate 30 through which the pipe 15 passes. The pipe 14 is passed through a lid 31 on the top of the housing 29. The housing 29 is also provided with apertures 32. Liquid medium, such as water, is fed by a pipe 33 through a nozzle 34 into the pipe 14. A tap 36 is mounted in the plate 30.

A gas which is to be cleansed or purified is introduced into the device 10 through the pipe 15 in the direction indicated by the arrow 37, and is withdrawn from the device 10 through the pipe 14 in the direction indicated by the arrow 38. The housing 29 is filled with liquid, such as water, up to the level indicated at 39.

During the rotation of the housing 11 at a speed of approximately 3000 r.p.m. and more by the motor 19 and means 16, 17, 18, the liquid in the housing 29 ascends the interior of the funnel-shaped portion 26 and forms, by centrifugal force, a ring of liquid on the interior of the housing 11. The radial depth or thickness of this ring or column of liquid is shown at 40. At the point of the greatest eccentricity the vanes 24 are located partially in the ring of liquid, as shown by the depth at 41. The ring of liquid 40 is carried along with the rotating housing 11 and itself drives or carries along the rotatable member 21 and the vanes 24. Thus, the rotatable member has nearly the same speed or velocity as the ring of liquid 40. During one revolution, the vanes 24 enter the ring of liquid up to their full depth and then issue again into the free space within the ring 40. During the passage through the free space, generally referred to by the numeral 42, the gas is combed in rapid succession by the wet vanes or combing members 24. Solid substances as, for example, dust entrained in the gas, is beaten out of the gas by means of the vanes. The dust accumulates on the wet vanes and is delivered to the liquid of the ring of liquid 41 by regular and successive immersion of the vanes. Since space 42 is larger than the width of the inlet and outlet pipes 15 and 14 the gases expand when entering the space 42, thus improving in this manner the purification effect.

A "washing" of gases takes place in the same manner. The ring of liquid 40 and the rotating housing 11 cooperate as a flywheel and need, therefore, fairly low force expenditures for rotating the housing 11. The thickness of the ring of liquid 40 is the distance between the interior of the housing 11 and the exterior of the outlet 28 disposed in the sleeve 27. In operation with hot gases the inner side of the ring of liquid becomes warm, and the cooler liquid, being specifically heavier, will be disposed in the middle of the ring of liquid. When new liquid is continuously admitted through the pipe 33 the warm liquid departs the ring of liquid and runs off through the outlet 28. Therefore, it is possible to continuously draw off the liquid through the tap 36, to purify it and to add it again through the pipe 34. The ring of liquid within the space 42 is thus regulated so that an unnecessary and undesirable intermixing of the liquid is avoided.

The embodiment of the invention shown in FIGS. 3 and 4 comprises a housing 43 which is stationary and is mounted on a plate 44. A bell-shaped rotatable member 45 is disposed eccentrically with respect to the axis of the housing 43 and is connected with a gas supply inlet 46. The rotatable member 45 is mounted on a shaft 47 that is journaled at 48 in the inlet 46. A motor 49 serves as driving means. A main pulley 50, a belt 51, and a pulley 52 driveably connect the shaft 47 to the motor 49.

Arranged on the outer periphery of the bell member 45 is at least one vane 53 which projects radially from said bell member. It is advantageous for the surface of each vane 53 to be provided with numerous apertures and is therefore preferably constructed in the form of a comb with teeth 54.

A gas which is to be treated is passed through the pipe 46 in the direction indicated by the headed arrow 60. A pipe 55 forms an outlet for the treated gas. The eccentric mounting of the bell-shaped member 45 in the housing 43 is arranged so that the vanes 53 and the teeth 54 thereof almost contact the interior of the housing 43 with their outer edges (unnumbered) at one side whereas at the other side of the housing they are considerably spaced from the housing wall, (FIG. 4). When the bell-shaped member 45 is rotated a ring of liquid 56 is formed on the inside of the stationary housing 43. Between the ring of liquid and the rotatable member 45 a free space 57 of crescent-shaped cross-section remains. Since the bell is offset eccentrically with respect to the ring of liquid 56, when the bell rotates the vanes 53 enter the ring of liquid up to its full depth and then issue again into the free space within the ring of liquid. During the passage through the crescent-shaped space the gas is combed in rapid succession by the wet vanes and purification thereof takes place as heretofore described with respect to FIGS. 1 and 2.

The illustrated embodiments of the invention show devices arranged to operate about a vertical axis. The devices may, however, also be arranged to operate on a horizontal axis. Instead of the bell a vane shaft is then expediently used which is arranged in the housing so that the vanes, arranged in a horizontally disposed cylindrical housing, almost contact the inner lower cylinder wall. The vanes remain spaced from the upper cylinder wall at a distance which corresponds approximately to the thickness of the ring of liquid to be formed. The inlet and outlet connections for the gas are directed upwardly and lead approximately at the height of the vane shaft into the horizontal-axis cylindrical housing.

I claim:
1. A process for the treatment of a gas to transfer substances in a gas to a liquid medium, which comprises:
   (a) imparting a rotational movement to a liquid mass to form a ring of liquid having a space internally;
   (b) passing said gas to be treated through said space internally of said ring;
   (c) providing combing means including vanes having openings;
   (d) combing said gas within said space in a direction transverse to the direction in which said gas is flowing, said combing being effected about an axis parallel to but eccentrically disposed with respect to the axis of said ring to thereby pass said combing means successively into and out of at least a substantial portion of the liquid of said ring; and, (e) further effecting said combing by rotating said vanes whose terminal end portions are at all times immersed in said ring of liquid.

2. A process for the treatment of a gas to transfer substances in a gas to a liquid medium, comprising:
(a) providing a mass of the liquid medium;
(b) imparting a rotational movement to said mass to form a ring of liquid medium having an interior free space;
(c) flowing the gas to be treated through said space;
(d) passing vanes having openings alternately into said space and into the liquid medium in a direction transverse to the direction in which said gas is flowing, said passing step effecting a combing action about an axis that is eccentrically disposed with respect to said ring, which causes the substances in the gas to be transferred to the liquid medium; and
(e) exhausting a substantially purified gas.

3. A gas purifying device comprising:
(a) a stationary housing having inlet and outlet means;
(b) a rotatable housing within said stationary housing;
(c) a rotatable member having radially disposed vanes;
(d) means mounting said rotatable member eccentrically within said rotatable housing; and
(e) a driving means for rotating said rotatable member with respect to said rotatable housing wherein said rotatable housing is directly driven and said rotatable member is indirectly driven.

References Cited
UNITED STATES PATENTS

| | | | |
|---|---|---|---|
| Re. 14,522 | 9/1918 | Kollberg et al. | 261—87 |
| 856,732 | 6/1907 | Saaler | 55—223 |
| 859,427 | 7/1907 | Brandenburg | 59—91 |
| 1,459,442 | 6/1923 | Cutler | 55—230 |
| 1,641,018 | 8/1927 | Thurchak | 261—88 X |
| 171,963 | 1/1876 | Sweeney | 55—223 |
| 1,760,774 | 5/1930 | Peters | 261—84 |

FOREIGN PATENTS

| | | |
|---|---|---|
| 221,966 | 5/1910 | Germany. |
| 295,867 | 12/1916 | Germany. |
| 208,343 | 3/1960 | Austria. |

REUBEN FRIEDMAN, *Primary Examiner.*

J. ADEE, *Assistant Examiner.*